(12) United States Patent
Bisson et al.

(10) Patent No.: US 7,914,840 B2
(45) Date of Patent: Mar. 29, 2011

(54) EGG-BASED POWDER

(75) Inventors: Jean-Pierre Bisson, Caen (FR); Denis Abraham, Coquainvilliers (FR)

(73) Assignee: Nestec S.A., Vevey (CH)

( * ) Notice: Subject to any disclaimer, the term of this patent is extended or adjusted under 35 U.S.C. 154(b) by 759 days.

(21) Appl. No.: 11/436,547

(22) Filed: May 19, 2006

(65) Prior Publication Data

US 2006/0210690 A1 Sep. 21, 2006

Related U.S. Application Data

(60) Division of application No. 10/852,489, filed on May 25, 2004, now abandoned, which is a continuation-in-part of application No. 10/347,465, filed on Jan. 21, 2003, now abandoned, which is a continuation of application No. PCT/EP01/08095, filed on Jul. 12, 2001.

(30) Foreign Application Priority Data

Jul. 21, 2000 (EP) .................................. 00115708

(51) Int. Cl.
*A23L 1/32* (2006.01)
(52) U.S. Cl. ........ 426/614; 426/634; 426/426; 426/428; 426/429; 426/430
(58) Field of Classification Search .................. 426/634, 426/426, 428, 429, 430, 614
See application file for complete search history.

(56) References Cited

U.S. PATENT DOCUMENTS

| | | | | | |
|---|---|---|---|---|---|
| 2,476,412 | A | * | 7/1949 | Harris | 426/47 |
| 3,060,038 | A | * | 10/1962 | Mancuso et al. | 426/10 |
| 3,143,427 | A | | 8/1964 | Thies | 99/114 |
| 3,475,180 | A | | 10/1969 | Jones | 426/614 |
| 4,364,966 | A | | 12/1982 | Chang | 426/573 |
| 4,440,791 | A | | 4/1984 | MacKenzie | 426/43 |
| 4,808,425 | A | | 2/1989 | Swartzel et al. | 426/399 |
| 5,037,661 | A | | 8/1991 | Merchant et al. | 426/47 |
| 5,741,539 | A | | 4/1998 | Knipper et al. | 426/614 |
| 2001/0051196 | A1 | * | 12/2001 | Mutsaers | 426/18 |

FOREIGN PATENT DOCUMENTS

| AU | 199728778 | 1/1998 |
|---|---|---|
| EP | 0 820 704 | 1/1998 |
| FR | 2 118 688 | 7/1972 |
| FR | 2 737 643 | 2/1997 |
| GB | 612503 | 7/1939 |

OTHER PUBLICATIONS

Gorsline et al., "Pasturization of Liquid Whole Egg Under Commercial Conditions to Eliminate *Salmonella*," Circ. No. 897, Oct. 1951, USDA, pp. 1-15.

* cited by examiner

*Primary Examiner* — Anthony Weier
(74) *Attorney, Agent, or Firm* — Winston & Strawn LLP

(57) ABSTRACT

A process for preparing a texturizing powder by creating a mixture of egg and milk protein components, pasteurizing the mixture at a temperature that is sufficiently high to eliminate bacteria, and drying the pasteurized mixture to form a powder that retains the functional and organoleptic properties of the egg when reconstituted in an aqueous medium is provided. A texturizing powder and edible compositions including the powder are also described.

13 Claims, No Drawings

EGG-BASED POWDER

CROSS-REFERENCE TO RELATED APPLICATIONS

This application is division of U.S. application Ser. No. 10/852,489 filed May 25, 2004, now abandoned which is a continuation-in-part of U.S. application Ser. No. 10/347,465 filed Jan. 21, 2003, now abandoned which is a continuation of International Application No. PCT/EP01/08095 filed Jul. 12, 2001, the content of each of which is expressly incorporated herein by reference thereto.

BACKGROUND

The invention relates to a pasteurized egg-based powder whose organoleptic and functional properties are functionally similar to those of egg after reconstituting in an aqueous medium. It also relates to an egg-based fermented food of a novel type, manufactured from such a composition.

Eggs are often used for their excellent functional properties, for example their gelling and emulsifying properties, for their color and taste. It is known that egg-based food products are not free of microbiological risks since eggs may contain sporulated microorganisms and salmonella. Egg proteins usually lose their functional properties, in particular their gelling ability, under the heat treatment conditions which would be necessary for the elimination of such spores and salmonella. As is known in the art, the main problem in manufacturing dried-egg products is that the elimination of Salmonella and other bacteria requires the application of heat at high temperatures to the egg mixture during a pasteurization step, but the application of high temperatures causes the egg to coagulate. Since the coagulation process is irreversible, once the egg coagulates the egg product has lost its thickening function for other food applications.

Accordingly, industrial egg products are generally pasteurized, but this does not eliminate all risks. Because of residual risks, the use of eggs is limited. In particular, the use of eggs which have been simply pasteurized in a conventional manner under conditions which maintain their organoleptic and functional properties cannot be successfully and safely used in food products which have to undergo fermentation.

For example, U.S. Pat. No. 3,475,180 to Jones recognizes that a pasteurization step which requires temperatures above of above 148° F. (64.4° C.) to pasteurize the egg will cause the egg to coagulate. To overcome this problem, Jones proposes a reduced calorie, egg substitute in which specific amounts of yolk are removed from the egg. The removal of the egg yolk makes the egg product low-calorie since egg yolk comprises mostly fat. Also, the egg yolk protein is replaced with other selected proteins that do not coagulate during pasteurization. To overcome the lost functional properties of the egg product due to the pasteurization step, Jones teaches the addition of a thickening agent to supplement or replenish lost functional properties of the already-coagulated egg.

A spray-dried composition based on egg and skimmed milk capable of being reconstituted in water is known for example from FR-A-2 118 688. This composition results from drying a mixture of whole egg and skimmed milk which have been separately pasteurized. In particular, the egg is heat-treated at 64.5° C. for 2½ minutes, a treatment that does not make it possible to ensure complete absence of salmonella. Such a complete treatment is not necessary in the context of that document since the egg/milk powder is intended for use in cakes which are manufactured by prolonged baking of the mix at high temperature. In comparison, this composition cannot be safely used in uncooked food products, for example, dairy products.

A fermented drink based on milk and egg is also known for example from FR-A-2 737 643. Such a drink is manufactured by preparing a liquid egg mixture which has been highly diluted in water, supplemented with skimmed milk powder, glucose and fructose and a content of egg not exceeding 10% in the mixture, heat treating by pasteurization, and then cooling followed by lactic acid fermentation of the mixture thus treated. This product is not based on a powder and the egg is treated with a high temperature while being highly diluted in water.

It is also known from EP-A-0 820 704 that it is possible to sterilize a mixture of milk, egg and sugar by the liquid route and, where appropriate, drying the mixture, thereby losing the functional properties of the egg and using the gelling properties of the casein in the presence of calcium under the effect of heat to replace the functional properties of the egg which are lost during the sterilizing heat treatment. The re-established gelling properties of the system are exploited to manufacture desserts of the flan type.

The problem forming the basis of the present invention is the making available of a product based on whole egg, which would have the desired functionality, in particular the emulsifying ability and the gelling capacity, which could be used in the preparation of food products while being hygienic and in particular which would be suitable for the preparation of dairy food products. The prior art does not address this problem.

There also is a need for an easy to use texturizing powder, which has a natural image, the advantage of egg, and which is safe to use in all food products including uncooked foods. This need is now met by the present invention.

SUMMARY OF THE INVENTION

The invention relates to a process for preparing a texturizing powder. The method includes creating a mixture of egg and milk protein components, pasteurizing the mixture at a temperature that is sufficiently high to eliminate bacteria, and drying the pasteurized mixture to form a powder that retains the functional and organoleptic properties of the egg when reconstituted in an aqueous medium. The drying may include spray-drying.

In one embodiment, the pasteurization temperature is above 65° C. Preferably, the pasteurization temperature is above 67° C.

The milk protein component generally includes a whey concentrate containing 35 to 80% by weight of proteins. The egg component typically includes a low temperature pasteurized whole egg which has not been coagulated. The egg component usually includes 20.1 wt. % to 100 wt. % of egg yolk and 0 to 79.9 wt. % of egg white.

In another embodiment, at least 30% by weight of the dry matter content of the powder is derived from whey. In a preferred embodiment, the amounts of egg and milk protein are selected so that the dry weight ratio of egg to milk protein in the powder is 0.5:1 to 1.5:1.

The present invention also related to a texturizing powder obtained by a process in accordance with the invention. Generally, the powder is free of stabilizing or emulsifying additives. The powder is preferably reconstitutable in water. In one embodiment, the dry weight ratio of egg to milk protein in the powder is 0.5:1 to 1.5:1.

The present invention further relates to an edible composition comprising a food product or beverage which contains a powder in accordance with the invention. The composition may be any suitable form, but is preferably in the form of a gelled dessert, a set or creamy fermented milk or yogurt, an acid drink, a dessert mousse, a fromage frais, or a mayonnaise.

The present invention additionally relates to a process for preparing a fermented food product. The process includes creating a mixture of milk, carbohydrates, and a powder in accordance with the invention, and treating the mixture by lactic acid fermentation to form the fermented food product. In a preferred embodiment, the process further includes pasteurizing the mixture before treatment by lactic acid fermentation.

The present invention likewise relates to a process of preparing a texturizing powder. The process includes creating a mixture of a lactic base and liquid egg, pasteurizing the mixture at above 65° C., and drying the mixture to form a powder that retains the functional and organoleptic properties of the egg when reconstituted in an aqueous medium.

In an embodiment, the process further includes adjusting the pH to a value of from 6.5 to 7.5. In yet another embodiment, the mixture is pasteurized at a temperature of at most 78° C. for 10 to 20 seconds so that the egg is not coagulated.

DETAILED DESCRIPTION OF THE PREFERRED EMBODIMENTS

In one preferred aspect, the invention relates to a texturizing powder suitable for use in cooked and uncooked food products, comprising a pasteurized mixture of non-coagulated egg and milk protein wherein the mixture is pasteurized at a temperature above 65° C.

In another preferred aspect, the present invention relates to a texturizing powder for a food product comprising a milk protein component, and an egg component, with the components being pasteurized, in the form of a mixture, so as to eliminate bacteria, the mixture being dried, and the powder retaining the functional and organoleptic properties of the egg once reconstituted in an aqueous medium.

In yet another preferred aspect, the present invention relates to a texturizing powder comprising egg and milk protein, the powder obtainable by creating a mixture of egg and milk protein, pasteurizing the mixture at a temperature above 65° C., and then drying the mixture.

The powder is stable for a long period from a microbiological point of view and has the property of not being susceptible to recontamination as would be the case for a composition in liquid form. Furthermore, there is no phase separation or settling out during storage or upon reconstitution.

Without wishing to be bound by theory it is postulated that the milk or whey proteins protect the egg proteins from coagulation at a temperature above 64° C. This protection may account for the ability to conduct a pasteurization even above 70° C., which means that hygiene criteria for many uncooked products are met, while at the same time the functional properties of egg are not lost.

The present invention also relates to a food product or a beverage which contains the powder. Alternatively, a chilled dairy product can be prepared which contains pasteurized eggs as a texturizing agent and which has the same organoleptic properties of a product containing fresh eggs. In another aspect, the present invention provides a process for manufacturing a chilled dairy product, in which a mixture of whole milk or milk which has been skimmed to a greater or lesser degree, carbohydrates and the powder set out above is prepared by dissolution and the mixture is treated by lactic acid fermentation.

In another aspect, the present invention relates to the use of the powder described above as a replacement for egg in an egg-based product. This powder can be obtained without addition of stabilizing or emulsifying additives, and without adding water before pasteurization.

The texturizing powder according to the invention is free of any thickening agent, thickener or similar additives, such as stabilisers, emulsifiers, gellifying agents, texturizing agents, hydrocolloids, gelatin, or mixtures of two or more of these additives. In particular, the texturizing powder is free of conventional thickening agents such as methyl cellulose, methoxy methyl cellulose, its salts, and any mixtures of two or more of these agents.

The texturizing powder is also free of gellifying agents such as Carrageenan, processed eucheuma seaweed, locust bean gum (carob gum), guar gum, tragacanth, acacia gum (gum arabic), xanthan gum, karaya, tara gum, gellan gum, dextrin, modified starch, alkaline modified starch, bleached starch, oxidized starch, monostarch phosphate, distarch phosphate, phosphated distarch phosphate, acetylated distarch phosphate, acetylated starch, mono starch acetate, acetylated starch, mono starch acetate, acetylated distarch adipate, distarch glycerine, hydroxy propyl starch, hydroxy propyl distarch glycerine, hydroxy propyl distarch phosphate, starch sodium octenyl succinate, acetylated oxidized starch.

The powder is easily reconstitutable in water. Preferably, the dry weight ratio of egg to milk protein in the powder is 0.5:1 to 1.5:1, more preferably 0.8:1 to 1.2:1. If the milk protein is whey protein, the powder preferably comprises 35 to 55% of whey protein and 45 to 65% by weight of egg, with respect to dry matter. More preferably, it comprises 40 to 50% whey protein and 50 to 60% of egg.

The milk proteins are preferably derived from a whey concentrate containing 35 to 80% by weight of proteins. Such a concentrate is advantageously obtained from the ultrafiltration or the microfiltration of sweet or acid whey from casein making or from cheese making.

Pasteurization temperatures above 65° C., preferably above 67° C., even more preferably above 70° C., 72° C., 74° C. or 76° C., are used. The pasteurization temperature is generally between 70 and 75° C. In one embodiment, the pasteurization temperature is between 65° C. and 78° C., preferably between 70 and 76° C., and most preferably is between 72 and 76° C.

The egg preferably is whole egg. Whole egg consists of about 60% white and 40% yolk. More preferably, the egg component is low temperature pasteurised whole egg. Low temperature pasteurization of egg, in the context of the present invention, refers to a pasteurization temperature, which is equal to or lower than 65° C. In general, it refers to a temperature at which the egg proteins contained in egg do not coagulate. For undiluted eggs or eggs not supplemented by additives this temperature is considered to be around 64.5° C.

As noted above, at least 30% by weight of the dry matter content of the powder is derived from whey.

The invention also relates to a process for preparing a product above, in which a concentrated lactic base rich in whey protein or in leguminous plant protein, and liquid egg is mixed, and then the mixture is pasteurized by heat treatment at above 65° C. while preserving the organoleptic and functional properties of the egg are the mixture is dried.

In an embodiment of the process, in which the egg component and the lactic base are mixed, the pH is adjusted, where appropriate, to a value ranging from 6.5 to 7.5, and the mixture is then pasteurized at a temperature of at most 78° C. for 10-20 s.

In the context of the invention, the expression lactic base rich in whey protein is understood to mean any raw material of lactic origin containing lactic proteins, rich in serum proteins, in particular in lactalbumins. It is possible to use any raw material containing whey proteins in concentrated form, for example an acid whey from casein making or a sweet whey from cheese making, obtained by separating the curd containing the casein, preferably concentrated by ultrafiltration or microfiltration, followed, where appropriate, by diafiltration (ultrafiltration with washing with water). The concentrate may be demineralized or made lactose free to a greater or lesser degree.

As a variant, it is possible to use, as source of lactic protein, a vegetable milk, for example a soybean milk, concentrate or isolate, with a high concentration of proteins. Equally, the milk protein may be replaced by meat protein.

The liquid egg which may be used in the process of the invention may be a mixture of egg yolk and egg white, or preferably a whole egg in liquid form, which has been pasteurized beforehand. It is possible to use fresh egg, ripened egg, that is to say which has been stored at refrigeration temperature, for example at about 4° C., for a period of up to several days, a mixture of egg white and egg yolk having been ripened separately, whole egg enriched with egg yolk or with egg white, all these raw materials having been separately pasteurized.

The egg component generally comprises more than 20 wt. % of egg yolk, such as 20.1 wt. % to 100 wt. % of egg yolk and 0 to 79.9 wt. % of egg albumen. The egg component preferably comprises 25 to 90 wt. % of egg yolk and 10 to 75 wt. % of egg white, more preferably 30 to 90% of egg yolk and 10 to 70 wt. % of egg white, most preferably, 40 to 80 wt. % of egg yolk and 20 to 60 wt. % of egg white.

To carry out the process, the undiluted egg component and the milk protein component are mixed, with stirring, the pH is adjusted, where appropriate, to a value ranging from 6.5 to 7.5, and then the mixture is preheated, for example using a plate exchanger, preferably at a temperature of less than or equal to 75° C.

The pasteurization treatment may be carried out in an indirect manner by means of a plate exchanger. As a variant, it is possible to carry it out in a jacketed holding unit. The pasteurization should be carried out under conditions which are lethal for salmonella while making it possible not to coagulate the egg, in short to preserve its functional qualities, in particular its emulsifying and gelling powers, and its organoleptic qualities, in particular its taste and its color. It takes place preferably at a temperature of at most 76° C. for 10-20 s.

The mixture in question is then dried, for example spray-dried in a drying tower under moderate to medium conditions.

Once dried, and where appropriate supplemented with other dehydrated ingredients of the recipe, the mixture may be reconstituted with an aqueous medium and then subjected to subsequent treatment for preparing an egg-based food as a replacement for egg.

Thus, the powder according to the invention may be used as a basic ingredient in any food comprising the use, in the form of a mixture, of milk, egg and carbohydrates with the aim of forming a gel upon cooking. There may be mentioned savory culinary preparations for flan, omelettes, quiches or sauces, or sweetened preparations for pastry, in particular for cakes, creams or flans.

In the food or beverage products of the invention, the powder is included as a texturizing agent. Alternatively, the product may contain pasteurized eggs as a texturizing agent. The pasteurized eggs or the reconstituted powder have essentially or exactly the same functional or organoleptic properties of a product containing fresh eggs. Generally, these products are free of other gellifying and texturizing agents, additives, hydrocolloids or gelatine.

The invention also relates to dairy product containing egg, chosen from milk drinks, yogurts and desserts, containing 0.5 to 10% by weight of a powder above. For example, a chilled dairy product which contains the pasteurized eggs of the invention as a texturizing agent has essentially the same functional properties of a chilled dairy product that contains fresh eggs.

The product may be in the form of a gelled dessert of the flan or mousse type. It may be in the form of set or creamy yogurt. It may also constitute an acid drink or a fromage frais. In an embodiment, the food product is a mayonnaise.

The invention also relates to a process for manufacturing a fermented food product above, in which a mixture of whole milk or milk which has been skimmed to a greater or lesser degree, carbohydrates and powder described above is prepared by dissolution and the mixture is treated so as to form a gel by lactic acid fermentation.

It is possible to start with fresh milk, standardized by adding cream or vegetable fat. It is also possible to start with milk reconstituted from skimmed milk powder and anhydrous lactic fat.

The carbohydrates which may be used in the above process are in particular sucrose and lactose, when it is desired to use the product according to the invention to manufacture a sweetened food, alone or in the form of a mixture. The carbohydrates represent 3 to 20% and preferably about 10% by weight of the mixture.

After dissolution, the mixture may be pasteurized, for example at 90-105° C. for 2 to 10 min, cooled to about 70-75° C. and then homogenized in a 1 or 2-stage homogenizer, preferably, for a single stage, at a pressure of 75 to 300 bar, or for two stages, at pressures of 75/15 bar to 300/60 bar, and then cooled to a temperature, chosen for the fermentation, of 25 to 45° C.

The fermentation is carried out in a conventional manner. To do this, it is possible to use lactic ferments in yogurt and/or in fromage frais, where appropriate with probiotic ferments.

A gel may be prepared which may constitute the final fermented product. It is also possible to smooth the fermented mass or to give it a degree of overrun.

The fermented product thus obtained may constitute the final product or may constitute a fermented filling, where appropriate in the presence of other components as receptacle, inclusions, accessories or flavoring ingredients.

The heat treatment for pasteurizing the eggs in the form of a mixture with the milk proteins does not destroy the functional properties of the egg proteins. Thus, the preparation of a food, for example a flan or a mousse, remains possible by virtue of the exploitation of the gelling properties and of the overrun and emulsifying capacity of the egg proteins. In particular, the powder according to the invention is suitable for conventional cooking in a hot air oven or even for indirect sterilization in a heat exchanger, for example at 120-125° C./20 s in the presence of the other ingredients of the dessert.

If a mayonnaise is produced, the powder according to the present invention may replace part or all of the egg in the mayonnaise. Any mayonnaise may be produced with the powder, for example 80% fat, 50% or 35% fat (in percent by weight). The contents of all ingredients may therefore be varied according to personal gusto. Usually, all ingredients of the mayonnaise, including the powder, are mixed and the oil is emulsified in, which may be by batch wise operating emulsifier machines, with continuous emulsifier machines or with colloid mills. Different oil-drop sizes may be obtained by this process, for example 3 to 10 μm.

If the fat content is desired to be lower, there are usually thickeners mixed separately in an aqueous solution, heated and finally introduced into the basic mayonnaise as obtained above. In general, the same recipies like known may be used and the classic egg powders are just partially or totally replaced by the powder according to the present invention.

EXAMPLES

The examples below illustrate the invention. In these examples, the parts and percentages are by weight, unless otherwise stated.

Example 1

Preparation of a Powder

A sweet whey concentrate from cheese making, obtained from ultrafiltration and containing 35% of protein, is dissolved in water and liquid whole egg, pasteurized beforehand, is added in a tank, with stirring, so as to obtain 55.5% egg dry matter content per 44.5% whey dry matter content.

After having adjusted, where appropriate, the pH to a value of 6.8 to 7.2 by adding a food grade concentrated aqueous sodium hydroxide solution, the mixture is pumped, by means of a positive pump, to a plate exchanger where it is heated to 72° C. and maintained at this temperature for 15 s; it is cooled to 60° C. and then it is spray-dried in a drying tower in an air stream, the hot air admission temperature being 190° C. and the air outlet temperature 92° C.

Example 2

Preparation of a Filling for Quiche

The powder of Example 1 is used by dissolving it in an amount of 3.5% in 87.5% whole milk and adding 9% sucrose, as a base for producing a quiche Lorraine. After baking in an oven in a conventional manner, the texture and the taste of the quiche are similar to those of a traditional quiche.

Example 3

Preparation of a Fermented Dessert Flan

The powder of Example 1 is used by dissolving it in an amount of 2.88% in 84.6% whole milk and adding 8.72% sucrose. After pasteurizing at 105° C./2 min, the mixture is cooled to 45° C. and homogenized in a 2-stage device at an overall pressure of 300 bar, and it is then cooled to 40° C. It is inoculated with 3.8% of a mixture of ferments for yogurt and it is incubated at 40° C. until a pH of 4.7 is obtained. The product thus obtained is cooled in a cold chamber at 4-6° C. and stored at this temperature. After cooling, the firmness of the gel is totally comparable to that of a home-made flan obtained conventionally from fresh eggs.

Example 4

Preparation of a Stirred Yogurt

The powder of Example 1 is used by dissolving it in an amount of 3.42% in 84.12% of whole milk and by adding 8.66% sucrose. After pasteurizing at 105° C./2 min, the mixture is cooled to 45° C. and homogenized in a single-stage device at 300 bar, and it is then cooled to 40° C. It is inoculated with 3.8% of a mixture of ferments for yogurt and incubated at 40° C. until a pH of 4.6 is obtained. The fermented mixture is then smoothed, cooled to 6° C. and poured into pots which are sealed.

Example 5

Preparation of an Egg-Based Fermented Drink

The powder of Example 1 is used by dissolving it in an amount of 2.48% in 80.85% of water and adding 8.2% of sucrose, 7.07% of powdered skimmed milk and 1.38% of anhydrous lactic fat. After pasteurizing at 105° C./2 min, the liquid is cooled to 75° C. and the mixture is homogenized in a 2-stage device at an overall pressure of 300 bar and it is then cooled to 40° C. It is inoculated with 0.02% of a thermophilic lactic ferment for yogurt and incubated at 40° C. until a pH<5 is obtained; the curd mass is smoothed and cooled to 6° C. Pots are then filled and sealed in a traditional manner.

Example 6

Preparation of a Gelled Fermented Milk

A fatty gelled fermented milk of the yogurt type enriched with probiotic bacteria is prepared. 89.3 parts of milk respectively containing 30 g/l of lactic fat are mixed with 3.7 parts of powder of Example 1 and the mixture is preheated to 70° C.; it is pasteurized at 92° C./6 min and then, after cooling to 70° C., it is homogenized in a single-stage device at 300 bar. After cooling to 43° C., the mixture is inoculated with 2% of a common yogurt starter *Streptococcus thermophilus* and *Lactobacillus bulgaricus*, to which 5% of *Lactobacillus johnsonii* (La1, CNCM I-1227) is added. After packaging in pots, the fermentation is carried out at 38° C. until a pH of 4.6 is obtained, and then cooled to 6° C.

Example 7

Preparation of a Dessert Mousse

A pasteurized base which can be caused to acquire a degree of overrun, consisting of a mixture of lactic proteins, sugar, powder of Example 1, chocolate and cocoa, is prepared so as to manufacture a chocolate mousse, starting with the ingredients and in the proportions indicated in Table 1 below.

TABLE 1

| Ingredients | % |
| --- | --- |
| Whole milk or skimmed milk or water | 57.8 |
| Powder according to Example 1 | 4.6 |
| Sucrose | 14.6 |
| Dark chocolate and alkalized chocolate | 21 |
| Cocoa powder | 2 |

The ingredients are mixed, they are preheated to 70° C. and then they are heat-treated by UHT with direct injection of steam at 143° C./10 s. After cooling by expansion under vacuum at 70° C., and then by plate exchanger at 10° C., the mixture is aerated in a Mondomix® apparatus for producing overrun until an overrun of 75-100% by volume is obtained.

Example 8

Preparation of a Mayonnaise

An 80% fat mayonnaise (percent by weight) is prepared by mixing and stirring all ingredients but oil present in table 2 below. Then oil is emulsified in continuously with a roto/strato emulsifier machine. In so doing, a mayonnaise with a mean oil drop size of 3-10 □m is achieved.

TABLE 2

Ingredients for preparation of a 80%-fat mayonnaise

| Ingredients | % |
| --- | --- |
| Water | 8.6025 |
| Salt | 1.1000 |
| Spirit vinegar 11% | 2.700 |
| Lactic acid 88% | 0.7780 |
| Sunflower oil | 80.000 |
| Egg - milk powder from example 1 | 4.000 |
| Flavor, spices | 2.8195 |

What is claimed is:

1. A texturizing powder which is free of stabilizing or emulsifying additives and which is obtained by a process which consists essentially of:
creating a mixture of an egg component and a protein component;
pasteurizing the mixture at a temperature that is sufficiently high to eliminate bacteria but below that which would coagulate the egg component; and adjusting the pH to a value of from 6.5 to 7.5 before drying;
drying the pasteurized mixture to form a powder that retains the functional and organoleptic properties of the egg when reconstituted in an aqueous medium,
wherein the protein component comprises a lactic base that is rich in whey protein or in leguminous plant protein,
wherein the egg component is non-coagulated whole egg or a composition comprising 20.1 wt. % to 100 wt. % of egg yolk and 0 to 79.9 wt. % of egg white.

2. The powder of claim 1, which is reconstitutable in water.

3. The powder of claim 1, wherein the dry weight ratio of egg component to protein component in the powder is 0.5:1 to 1.5:1.

4. An edible composition comprising a food product or beverage which contains the powder of claim 1.

5. The composition of claim 4 in the form of a gelled dessert, a set or creamy fermented milk or yogurt, an acid drink, a dessert mousse, a fromage frais, or a mayonnaise.

6. The powder of claim 1, wherein the protein component comprises a lactic base that is rich in leguminous plant protein, the egg component is a liquid egg, and the mixture is pasteurized at above 65° C.

7. The powder of claim 1, wherein the protein component comprises a lactic base that is rich in whey protein, the egg component is a liquid egg, and the mixture is pasteurized at above 65° C.

8. The powder of claim 7, wherein at least 30% by weight of the dry matter content of the powder is derived from whey.

9. The powder of claim 7, wherein the pasteurization temperature is above 67° C. and the protein component comprises a whey concentrate containing 35 to 80% by weight of protein.

10. The powder of claim 1, wherein the egg component is a low temperature pasteurized whole egg which has not been coagulated.

11. The powder of claim 10, wherein the mixture is pasteurized at a temperature of at most 78° C. for 10 to 20 seconds so that the egg component is not coagulated.

12. The powder of claim 1, wherein the drying comprises spray-drying and the amounts of egg and protein components are selected so that the dry weight ratio of egg component to protein component in the powder is 0.5:1 to 1.5:1.

13. A texturizing powder consisting essentially of a pasteurized and dried mixture of an egg component and a protein component with a dry weight ratio of egg component to protein component of 0.5:1 to 1.5:1, obtained by a process consisting essentially of creating a mixture of an egg component and a protein component; pasteurizing the mixture at a temperature that is sufficiently high to eliminate bacteria but below that which would coagulate the egg component; adjusting the pH to a value of from 6.5 to 7.5 before drying and drying the pasteurized mixture to form a powder that retains the functional and organoleptic properties of the egg when reconstituted in an aqueous medium; wherein the egg component is not coagulated, the powder is reconstitutable in an aqueous medium and free of stabilizing or emulsifying additives, and the powder retains the functional and organoleptic properties of the egg component when reconstituted in an aqueous medium, wherein the protein component comprises a lactic base that is rich in whey protein or in leguminous plant protein, wherein the egg component comprises a whole egg or a composition comprising 20.1 wt. % to 100 wt. % of egg yolk and 0 to 79.9 wt. % of egg white.

* * * * *